US006866796B2

(12) United States Patent
Kang et al.

(10) Patent No.: US 6,866,796 B2
(45) Date of Patent: Mar. 15, 2005

(54) BLUE PHOSPHOR FOR FLUORESCENT DISPLAY AND METHOD FOR SYNTHESIZING THE SAME

(75) Inventors: Seung-youl Kang, Daejon (KR); Kyung-soo Suh, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1 day.

(21) Appl. No.: 10/329,271

(22) Filed: Dec. 24, 2002

(65) Prior Publication Data

US 2003/0122109 A1 Jul. 3, 2003

(30) Foreign Application Priority Data

Dec. 26, 2001 (KR) .......................................... 2001-85039

(51) Int. Cl.[7] .......................... C09K 11/65; C09K 11/55
(52) U.S. Cl. ............................................... 252/301.4 R
(58) Field of Search ................................ 252/301.4 R

(56) References Cited

U.S. PATENT DOCUMENTS 2,911,376 A * 11/1959 Rudolph ................... 252/521.6

6,013,199 A 1/2000 McFarland et al.

OTHER PUBLICATIONS

Definition of "annealing" from 14th ed. of Hawley's Condensed Dictionary.*

* cited by examiner

Primary Examiner—C. Melissa Koslow
(74) Attorney, Agent, or Firm—Blakely Sokoloff Taylor & Zafman

(57) ABSTRACT

Provided are a blue phosphor for a fluorescent display having a high luminous efficiency, and a method for synthesizing the same. The blue phosphor is obtained from a host composed of strontium carbonate ($SrCO_3$) and an activator composed of a cerium compound. The method for synthesizing the blue phosphor includes preparing a mixture having strontium carbonate ($SrCO_3$) and a cerium oxide ($CeO_2$) homogenously mixed according to the composition having the following general formula:

$$SrCO_3 + xCeO_2$$

wherein $0.01 \leq x \leq 0.5$, and annealing the mixture at 800 to 900° C.

9 Claims, 5 Drawing Sheets

BLUE PHOSPHOR FOR FLUORESCENT DISPLAY AND METHOD FOR SYNTHESIZING THE SAME

BACKGROUND OF THE INVENTION

1. Field of the Invention

The present invention relates to display technology, and more particularly, to a blue phosphor for a fluorescent display and a method for synthesizing the same.

2. Description of the Related Art

Fluorescent displays, in particular, field emission displays (FEDs) are flat-panel displays driven by the same operating principle as cathode ray tubes (CRTs), and are constructed such that a cathode plate, which is a field emitter array (FEA) panel emitting electrons by an electric field rather than by thermions, and an anode plate, which is a fluorescent panel receiving electrons to emit light, are a predetermined gap spaced apart and packaged in high vacuum state.

Conventional CRTs generally employ sulfide-based phosphors which are good in color purity and luminous efficiency. However, if FEDs, in which a space between a cathode plate and an anode plate is short, use a high voltage of 10 kV or greater like in CRTs, discharge occurs. Thus, FEDs use a low voltage of 5 kV or less. In particular, in order to develop FEDs operable at a voltage as low as 1 kV or less, various researches are globally being carried out.

However, if the electronic energy is as low as 1 kV or less, electrons can only be scanned as deep as 20 nm from a phosphor surface. Thus, the efficiency, particularly luminescence, of a phosphor for a low-voltage operating FED is considerably lower than a CRT operating at a high voltage. Also, the surface state of a phosphor greatly affect the luminous efficiency thereof.

In particular, when a conventional sulfide blue phosphor, ZnS: Ag, Al, which has been widely used in CRTs, is used as an FED phosphor, it exhibits bad luminous efficiency and color purity at low voltages. Also, prolonged E-beam scanning gives rise to desorption of a trace of sulfur from sulfide-based phosphors, resulting in a decrease in the internal vacuum degree for smaller volume in the case where the distance between a cathode plate and an anode plate is approximately 1 mm like in an FED panel or impairing an FEA, thereby deteriorating display performance. To address such problems, vigorous research into oxide-based phosphors free from the risk of desorbing sulfur therefrom has recently been made.

For variety of applications, there is increasing demand for phosphors capable of exhibit high luminescence at low production cost. In order to reduce the production cost, not only the source material cost but also the processing cost required for manufacturing phosphors must be low. In current actuality, the major factor in the processing cost is the firing temperature in the course of synthesis. Under the circumstances, in order to obtain low-cost phosphors, it is quite important to synthesize highly luminescent phosphors that can be synthesized at a low firing temperature.

SUMMARY OF THE INVENTION

To solve the above problems, it is an object of the present invention to provide a blue phosphor for a fluorescent display, which has a high luminous efficiency at low voltages and can be synthesized at a low firing temperature without desorption due to prolonged E-beam scanning.

It is another object of the present invention to provide a method for synthesizing a blue phosphor for a fluorescent display, which has a high luminous efficiency at low voltages and can be synthesized at a low firing temperature without desorption due to prolonged E-beam scanning.

To achieve the first object, the present invention provides a phosphor for a fluorescent phosphor blue phosphor for a fluorescent display obtained from a host composed of strontium carbonate ($SrCO_3$) and an activator composed of a cerium compound.

The cerium compound is preferably a cerium oxide ($CeO_2$), and the host and the activator are preferably mixed in a molar ratio of 1:0.01~1:0.5.

To achieve the second object, the present invention provides a method for synthesizing a blue phosphor for a fluorescent display, including preparing a mixture having strontium carbonate ($SrCO_3$) and a cerium oxide ($CeO_2$) homogenously mixed therein, and firing the mixture.

The strontium carbonate ($SrCO_3$) and the cerium oxide ($CeO_2$) are preferably mixed according to the composition having the following general formula:

$$SrCO_3 + xCeO_2$$

wherein $0.01 \leq x \leq 0.5$.

Preferably, the strontium carbonate ($SrCO_3$) and the cerium oxide ($CeO_2$) are mixed in a molar ratio of 1:0.05.

Here, firing is preferably performed at approximately 800° C. to approximately 900° C. for approximately 12 to approximately 36 hours.

According to the blue phosphor of the present invention, when it is applied to a fluorescent display or used as an anode plate of an FED phosphor, it can prevented from being destructed due to prolonged scanning time so that the degree of vacuum between the cathode plate and the anode plate can be maintained, thereby maintaining the panel performance for a long time of period. Also, since the synthesis temperature of the blue phosphor for a fluorescent display according to the present invention is lower than that of the conventional phosphor, the production cost can be remarkably reduced while exhibiting high luminescence. Therefore, when the blue phosphor according to the present invention is applied to a fluorescent display, it can exhibit good characteristics such as high luminescence or high definition and can make a large contribution to commercialization of low voltage FEDs.

BRIEF DESCRIPTION OF THE DRAWING

The above objective and advantages of the present invention will become more apparent by describing in detail preferred embodiments thereof with reference to the attached drawing in which.

DETAILED DESCRIPTION OF THE INVENTION

Figure 1:
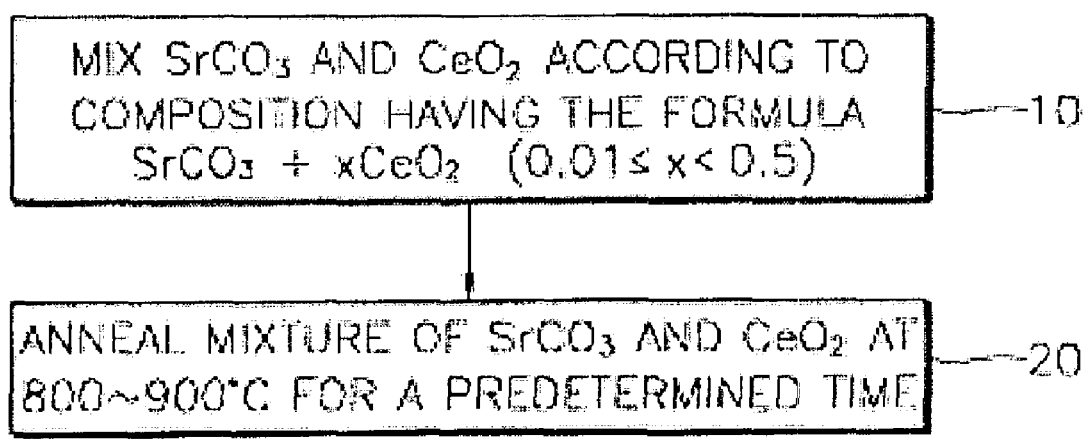
FIG. 1 is a flow chart for explaining a method for synthesizing a blue phosphor for a fluorescent display according to a preferred embodiment of the present invention.

FIG. 1 is a flow chart for explaining a method for synthesizing a blue phosphor for a fluorescent display according to a preferred embodiment of the present invention.

Referring to FIG. 1, a mixture having strontium carbonate ($SrCO_3$) as a host and cerium oxide ($CeO_2$) as an activator homogenously mixed is prepared (step 10). To this end, strontium carbonate ($SrCO_3$) and cerium oxide ($CeO_2$) are put into a mortar containing alcohol as a solvent according to the composition having the following general formula, followed by homogenously mixing and drying:

$$SrCO_3+xCeO_2$$

wherein $0.01 \leq x \leq 0.5$.

Thereafter, the resultant dried mixture obtained in step 10 is put into an alumina tube and firing at an electric heater maintained at a temperature of approximately 800 to 900° C. for approximately 12 to 36 hours, thereby synthesizing a desired phosphor (step 20).

If the firing temperature exceeds 1000° C., different phase phosphors are generally synthesized. In particular, a sample annealed at 1000° C. is chemically unstable so that it easily reacts with $CO_2$ or $H_2O$ under the atmospheric condition. However, according to the present invention, the blue phosphor is synthesized at a relatively low temperature of approximately 800 to 900° C. Therefore, the production cost of phosphors capable of exhibiting high luminescence can be greatly reduced.

Figure 2:
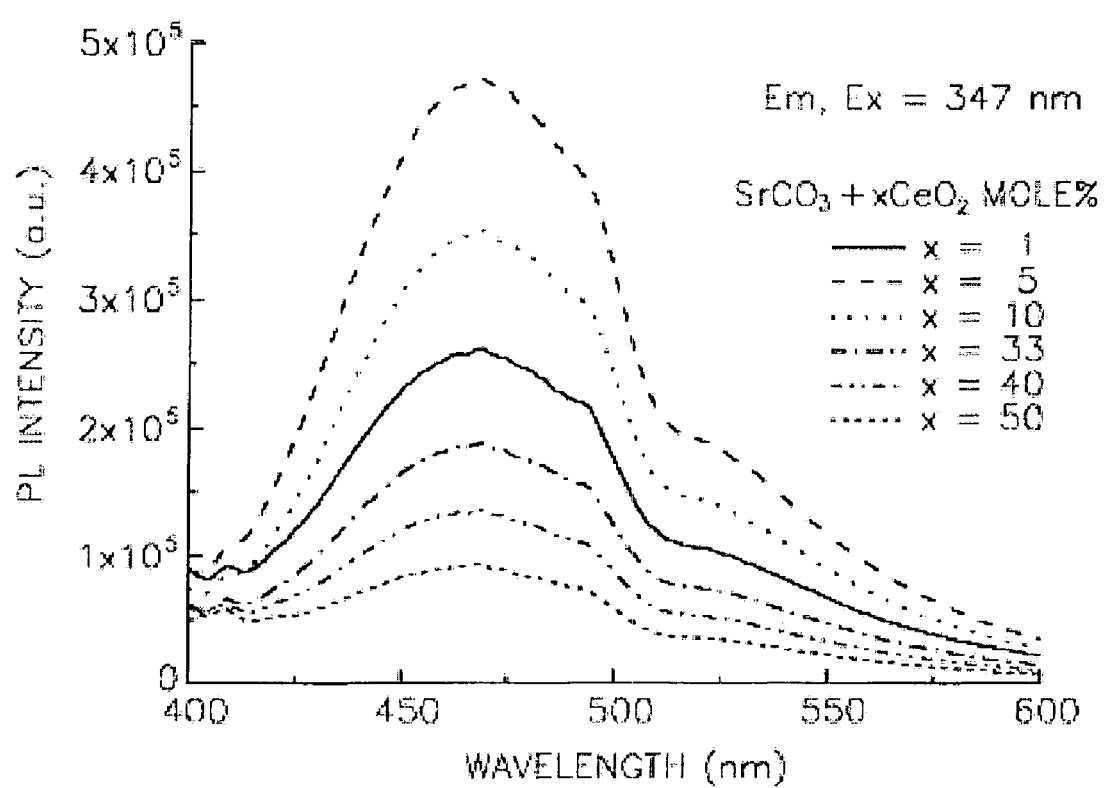
FIG. 2 is a photoluminescence (PL) emission spectrum of the blue phosphor for a fluorescent display according to a preferred embodiment of the present invention.

FIG. 2 is a photoluminescence (PL) emission spectrum of the blue phosphor for a fluorescent display according to a preferred embodiment of the present invention. In detail, samples having the general formula $SrCO_3+xCeO_2$ (x=0.01, 0.05, 0.1, 0.33, 0.4 and 0.5) are annealed at 800° C. under the atmospheric condition for 12 hours, yielding powder of the phosphor according to the present invention, and then PL properties of the powder are evaluated. The results are shown in FIG. 2. Referring to FIG. 2, when x=0.05, the luminescence is highest. The wavelength at which the PL intensity is maximum is 470 nm, and the powder emits blue radiations.

Figure 3:
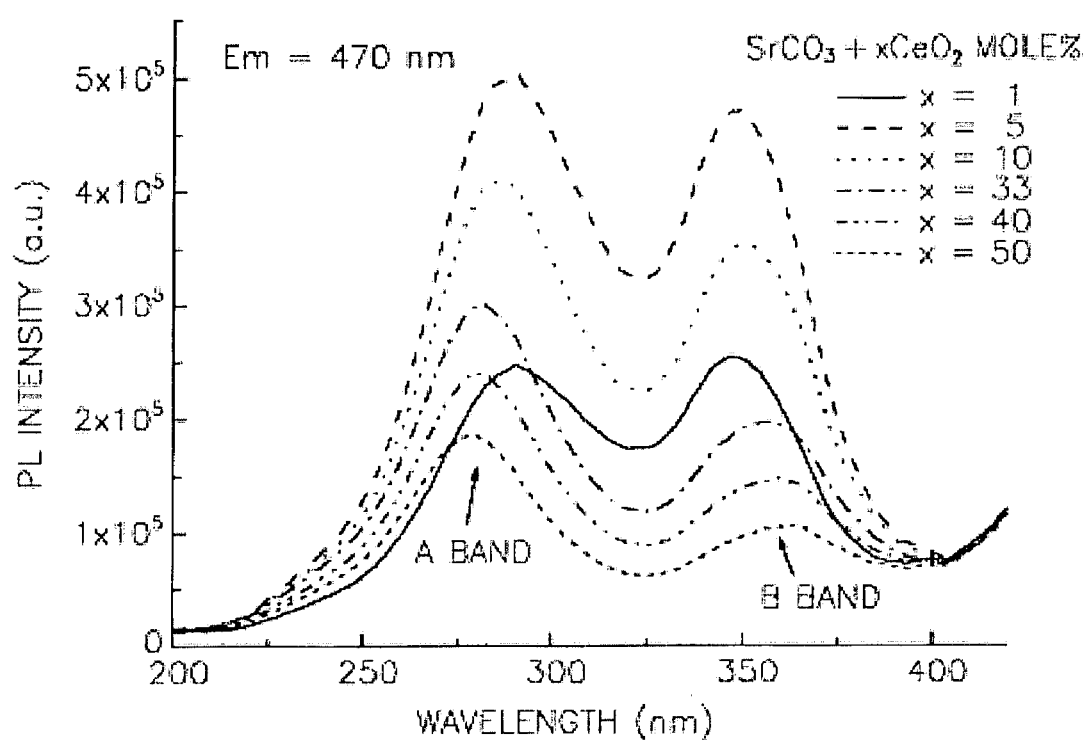
FIG. 3 is a PL excitation spectrum of the blue phosphor for a fluorescent display according to a preferred embodiment of the present invention.

FIG. 3 is a PL excitation spectrum of the blue phosphor for a fluorescent display according to a preferred embodiment of the present invention. In detail, samples having the general formula $SrCO_3+xCeO_2$ (x=0.01, 0.05, 0.1, 0.33, 0.4 and 0.5) are annealed at 800° C. under the atmospheric condition for 12 hours, yielding powder of the phosphor according to the present invention, and PL excitation spectral properties of the powder are shown in FIG. 3. Referring to FIG. 3, two bands are shown according to x value. When x=0.05, the luminescence is highest.

Figure 4:
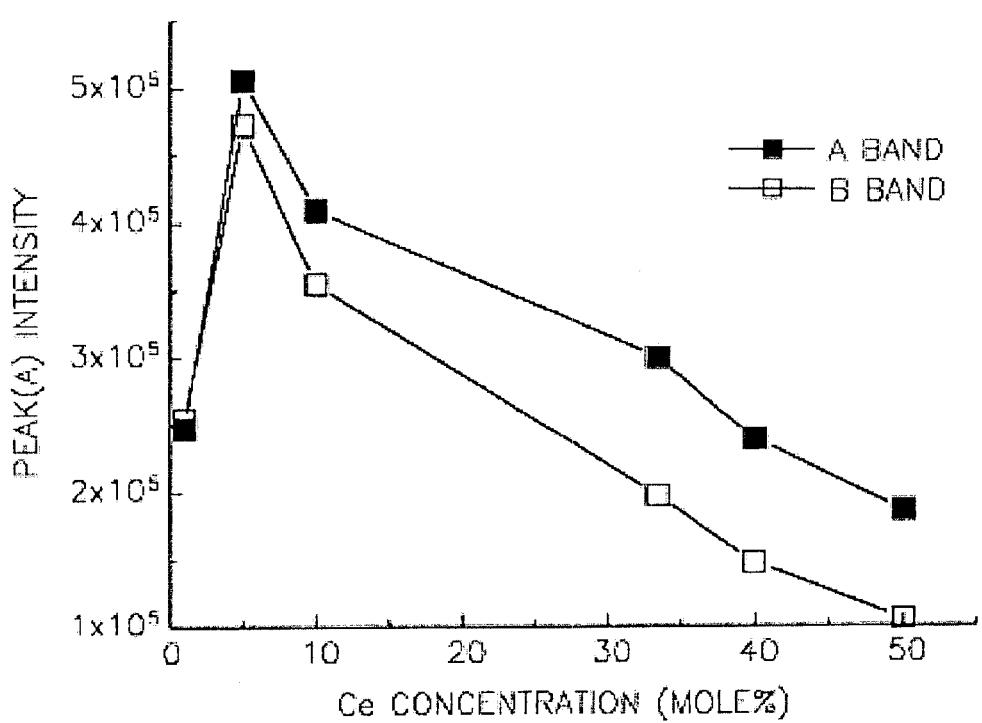
FIG. 4 is a graph showing the PL intensity of excitation spectrum (emission wavelength=470 nm) of the blue phosphor for a fluorescent display according to a preferred embodiment of the present invention, the PL intensity depending on a change in x.

FIG. 4 is a graph showing the PL intensity of excitation spectrum of the blue phosphor for a fluorescent display according to a preferred embodiment of the present invention, the PL intensity depending on a change in x. In detail, samples having the general formula $SrCO_3+xCeO_2$ (x=0.01, 0.05, 0.1, 0.33, 0.4 and 0.5) are annealed at 800° C. under the atmospheric condition for 12 hours, yielding powder of the phosphor according to the present invention, and then PL intensities thereof are measured according to a change in x value, when the emission wavelength is 470 nm. Referring to FIG. 4, when x=0.05, the luminescence is highest.

Figure 5:
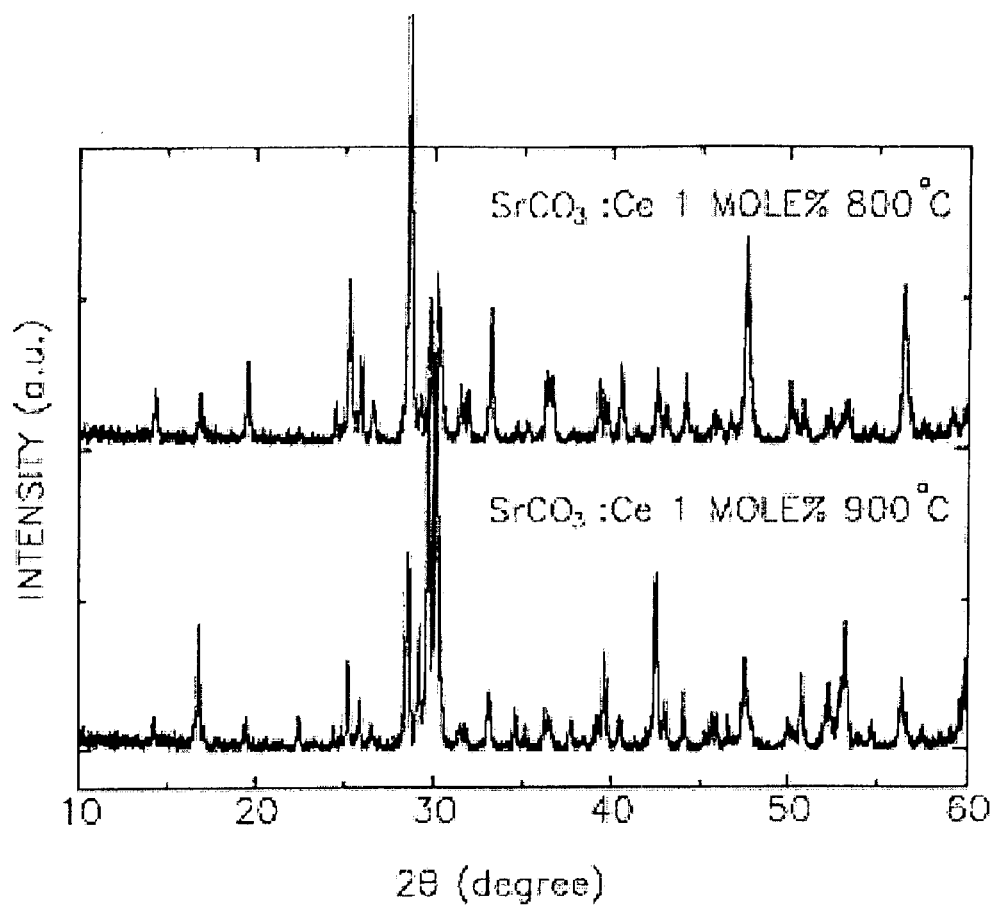
FIG. 5 is an X-ray diffraction spectrum depending on firing temperature of the blue phosphor for a fluorescent display according to a preferred embodiment of the present invention.

FIG. 5 is an X-ray diffraction spectrum depending on firing temperature of the blue phosphor for a fluorescent display according to a preferred embodiment of the present invention. In detail, samples having the general formula $SrCO_3+xCeO_2$ (x=0.01, 0.05, 0.1, 0.33, 0.4 and 0.5) are fired at 800° C. under the atmospheric condition for 12 hours, yielding powder of the phosphor according to the present invention, and then X-ray spectrums thereof are shown in FIG. 5. Referring to FIG. 5, main peaks of the sample powder fired at 800° C. indicate $SrCO_3$ and some peaks indicate $Sr(OH)_2$. In the sample powder fired at 900° C., main peaks indicate $SrCO_3$ and some peaks indicate $Sr_2CeO_4$.

The blue phosphor for a fluorescent display according to a preferred embodiment of the present invention is obtained from a host composed of strontium carbonate ($SrCO_3$) and an activator composed of cerium oxide ($CeO_2$), and it is synthesized at a relatively low firing temperature. The blue phosphor for a fluorescent display according to a preferred embodiment of the present invention is an oxide phosphor which is stable to thermal stimulus or other external stimuli such as E-beam scanning. Thus, when the ($SrCO_3+CeO_2$) oxide phosphor according to the present invention is applied to a fluorescent display or an anode plate of an FED phosphor, destruction thereof due to prolonged E-beam scanning can be prevented, so that the degree of vacuum of a space between a cathode plate and an anode plate is maintained, thereby maintaining panel performance for a long time of period. Also, since the phosphor for a fluorescent display according to the present invention has a very low synthesis temperature in the manufacture process compared to conventional phosphors, the production cost thereof can be remarkably reduced. Therefore, when the phosphor for a fluorescent display according to the present invention is applied, it can exhibit good properties including high luminescence or high definition. Also, the phosphor for a fluorescent display according to the present invention can make a large contribution to commercialization of low-voltage FEDs.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A blue phosphor for a fluorescent display obtained from a host composed of strontium carbonate ($SrCO_3$) and an activator composed of a cerium compound.

2. The blue phosphor of claim 1, wherein the cerium compound is a cerium oxide ($CeO_2$).

3. The blue phosphor of claim 1, wherein the host and the activator are mixed in a molar ratio of 1:0.01~1:0.5.

4. The blue phosphor of claim 2, wherein the host and the activator are mixed in a molar ratio of 1:0.01~1:0.5.

5. A method for synthesizing a blue phosphor for a fluorescent display, comprising:

(a) preparing a mixture having strontium carbonate ($SrCO_3$) and a cerium oxide ($CeO_2$) homogenously mixed therein; and (b) heating the mixture.

6. The method of claim 5, wherein in step (a), the strontium carbonate ($SrCO_3$) and the cerium oxide ($CeO_2$) are mixed according to the composition having the following general formula:

$$SrCO_3+xCeO_2$$

wherein $0.01 \leq x \leq 0.5$.

7. The method of claim 6, wherein the strontium carbonate ($SrCO_3$) and the cerium oxide ($CeO_2$) are mixed in a molar ratio of 1:0.05.

8. The method of claim 5, wherein in step (b), heating is performed at 800° C. to 900° C.

9. The method of claim 5, wherein in step (b), heating is performed for 12 to 36 hours.

* * * * *